United States Patent
Yang

(10) Patent No.: US 8,237,734 B2
(45) Date of Patent: Aug. 7, 2012

(54) PORTABLE ELECTRONIC DEVICE AND LIGHT FLICKERING METHOD FOR LIGHT EMITTING ELEMENT THEREOF

(75) Inventor: Ming-Jer Yang, Taoyuan (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 463 days.

(21) Appl. No.: 12/426,397

(22) Filed: Apr. 20, 2009

(65) Prior Publication Data

US 2009/0261739 A1   Oct. 22, 2009

(30) Foreign Application Priority Data

Apr. 22, 2008   (TW) ................................ 97114689 A

(51) Int. Cl.
*G09G 5/02* (2006.01)
*H05B 37/02* (2006.01)

(52) U.S. Cl. .......... 345/589; 345/36; 345/102; 315/149; 315/150; 315/151; 315/291; 315/307

(58) Field of Classification Search .......... 315/149–158, 315/291, 307, 312; 345/36, 102, 589
See application file for complete search history.

(56) References Cited

U.S. PATENT DOCUMENTS

| | | | | |
|---|---|---|---|---|
| 7,239,093 B2 * | 7/2007 | Hsieh | ............................. | 315/291 |
| 7,288,900 B2 * | 10/2007 | Biebl et al. | ..................... | 315/291 |
| 2003/0100346 A1 | 5/2003 | Kostiainen | | |
| 2005/0116667 A1 * | 6/2005 | Mueller et al. | ................. | 315/312 |
| 2007/0145915 A1 * | 6/2007 | Roberge et al. | ................ | 315/312 |
| 2007/0182346 A1 | 8/2007 | Shteynberg et al. | | |
| 2008/0006762 A1 * | 1/2008 | Fadell et al. | ................ | 250/201.1 |

FOREIGN PATENT DOCUMENTS

| | | |
|---|---|---|
| CN | 1770945 A | 5/2006 |
| DE | 29810903 | 12/1998 |
| JP | 2007 243998 | 9/2007 |
| WO | 03/039018 | 5/2003 |

OTHER PUBLICATIONS

English language translation of abstract of CN 1770945A.
English translation of abstract of JP 2007 243998.

* cited by examiner

*Primary Examiner* — Douglas W Owens
*Assistant Examiner* — Thai Pham
(74) *Attorney, Agent, or Firm* — Thomas, Kayden, Horstemeyer & Risley, LLP

(57) ABSTRACT

A portable electronic device and a light flickering method for light emitting elements thereof are both disclosed herein. The portable electronic device includes at least one light emitting element. The light flickering method comprises the following steps: setting personalized light flickering data with a user interface; storing the personalized light flickering data; generating a control signal in accordance with the personalized light flickering data; and generating a driving signal in accordance with the control signal and driving the light emitting elements with the driving signal.

16 Claims, 8 Drawing Sheets

_US 8,237,734 B2_

PORTABLE ELECTRONIC DEVICE AND LIGHT FLICKERING METHOD FOR LIGHT EMITTING ELEMENT THEREOF

RELATED APPLICATIONS

This application claims priority to Taiwan Application Serial Number 97114689, filed Apr. 22, 2008, which is herein incorporated by reference.

BACKGROUND

1. Field of Invention

The invention relates to an electronic device, more particularly, to a portable electronic device.

2. Description of Related Art

Portable electronic devices such as mobile phones, personal digital assistants, notebooks etc., are currently very advanced and integrating new functions into portable electronic devices is one of the trends for designing these devices. However, since the importance of a friendly user experience for portable electronic devices has been aware of by device designers, it becomes an attractive design for portable electronic devices to allow a user to adjust a variety of settings thereof so as to comply with the user's demands.

Take light emitting diodes disposed within the portable electronic device for example. The flickering mode of the light emitting diodes is predetermined and cannot be modified by a user.

Therefore, it is essential to provide a portable electronic device and a light flickering method for the light emitting element thereof, such that the aforesaid problems can be solved, and users are allowed to set personal flickering modes in accordance with their demand.

SUMMARY

Accordingly, one aspect of the invention provides a portable electronic device, and the flickering mode of the light emitting elements disposed within the portable electronic device can be adjusted in accordance with the demand of the user.

In one embodiment of the invention, the portable electronic device includes at least one light emitting element, a user interface, a storage unit, a first processing unit, and a driving signal generator. The user interface is configured to set personalized light flickering data, and the storage unit stores the personalized light flickering data. Moreover, the first processing unit generates a control signal in accordance with the personalized light flickering data stored in the storage unit, and the driving signal generator generates at least one driving signal in accordance with the control signal to drive the at least one light emitting element.

Another aspect of the invention provides a light flickering method for light emitting elements disposed within a portable electronic device. The method includes the following steps: setting personalized light flickering data with a user interface; storing the personalized light flickering data; generating at least one control signal in accordance with the personalized light flickering data; and generating a driving signal by a driving signal generator in accordance with the control signal and driving the light emitting element with the driving signal.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
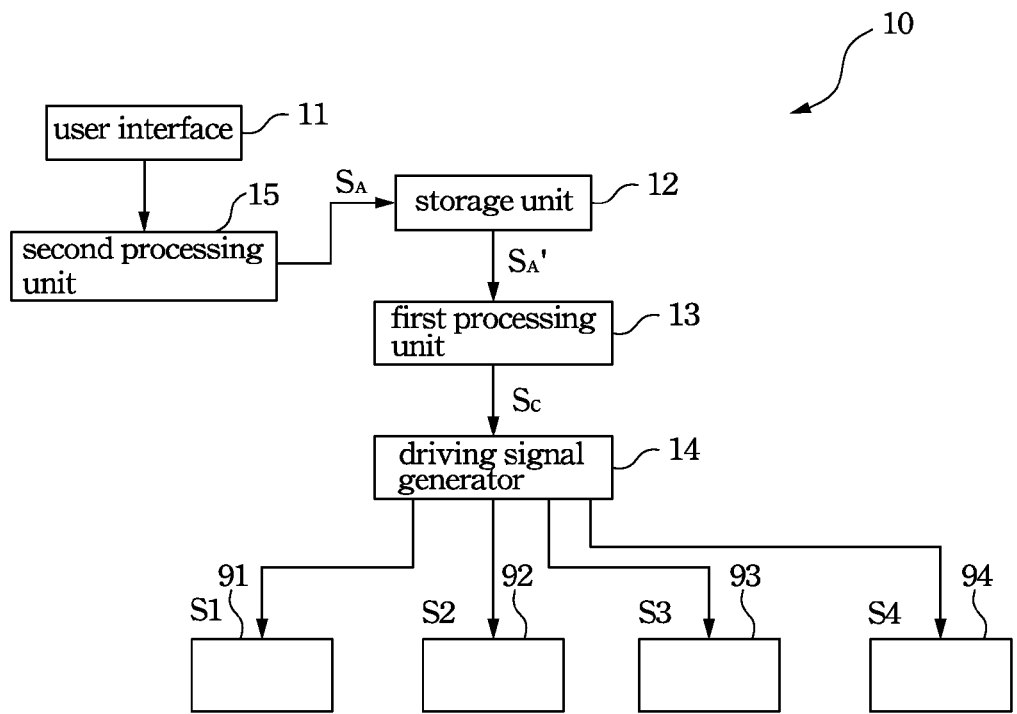
FIG. 1 is a functional block diagram of a portable electronic device according to a first embodiment of the invention.

Reference will now be made in detail to the present embodiments of the invention, examples of which are illustrated in the accompanying drawings. Wherever possible, the same reference numbers are used in the drawings and the description to refer to the same or like parts.

The following embodiments provide a portable electronic device and a light flickering method thereof, wherein the portable electronic device may be a mobile phone, a personal digital assistance, a notebook etc. However, only the mobile phone is illustrative in exemplary embodiments provided below.

FIG. 1 is a functional block diagram of a portable electronic device according to a first embodiment of the invention. With reference to FIG. 1, the mobile phone 10 includes light emitting diodes 91~94, whose flickering mode can be adjusted by users. In addition, the mobile phone 10 also includes a user interface 11, a storage unit 12, a first processing unit 13, a driving signal generator 14, and a second processing unit 15. The users of the mobile phone may input personalized light flickering data $S_A$, and the second processing unit 15 then transmits the personalized light flickering data $S_A$ into the storage unit 12 for storing the personalized light flickering data $S_A$. The first processing unit 13 may generate a control signal $S_C$ in accordance with the personalized light flickering data $S_A'$ outputted by the storage unit 12, and thus the driving signal generator 14 may generate driving signals S1~S4, in accordance with the control signal $S_C$, to the light emitting diodes 91~94 so as to respectively drive the diodes 91~94.

An exemplary personalized light flickering data $S_A$ will be described below.

The user interface for setting the personalized light flickering data $S_A$ includes a user operation interface displayed on a display of the mobile phone and an input element, such as a touch panel or at least one key, adapted to input desired setting data into the user operation interface. In addition, the user operation interface may be presented with an application program executed by the first processing unit 13. The user operation interface may provide a variety of setting items, and users can select one of the setting items to adjust corresponding parameters. For example, the user operation interface may include flickering setting items for the light emitting diodes, and users can select the flickering setting items, through the touch panel or the at least one key, to input the personalized light flickering data $S_A$.

In other words, flickering modes of the light emitting diodes 91~94 may be adjusted in accordance with the personalized light flickering data $S_A$ set through the user interface. The setting process of the personalized light flickering data $S_A$ will be described below.

Figure 2:
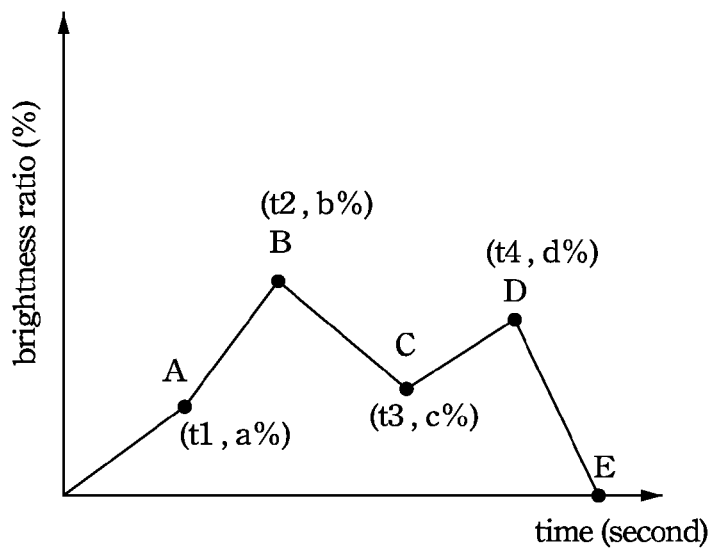
FIG. 2 is a schematic graph illustrating the personalized light flickering data according to the first embodiment of the invention.

FIG. 2 is a schematic graph illustrating the personalized light flickering data according to the first embodiment of the invention. Referring to FIG. 2, in the first embodiment, users can use a user interface to input timing values and the brightness ratios of different setting points A, B, C, and D, which are respectively referred to as (t1, a %), (t2, b %), (t3, c %) and (t4, d %), where the brightness ratios are ratios of luminance values to the highest luminance values of the light emitting diodes. In FIG. 2, the function among the different setting points A, B, C, D and E is linear function. In other embodiment, the function among the different setting points A, B, C, D and E can also be quadratic, cubic or exponential function.

FIG. 2 shows only a primary curve representing brightness variation of the light emitting diodes during a certain period. After flickering according to the primary curve, the light emitting diode can continue to flicker according to another curve formed by repeating, mirroring and reversing the primary curve. Additionally, after completing one cycle of flickering according to the primary curve, the light emitting diode can stop for a predetermined period and then begin to flicker again.

With such setting processes, the user can set some parameters of the setting points via the user interface in accordance with their own demand, such that a personal flickering mode corresponding to the setting points is acquired, and the light emitting diodes will flicker with the personal flickering mode to meet the user's requirement.

Figure 3:
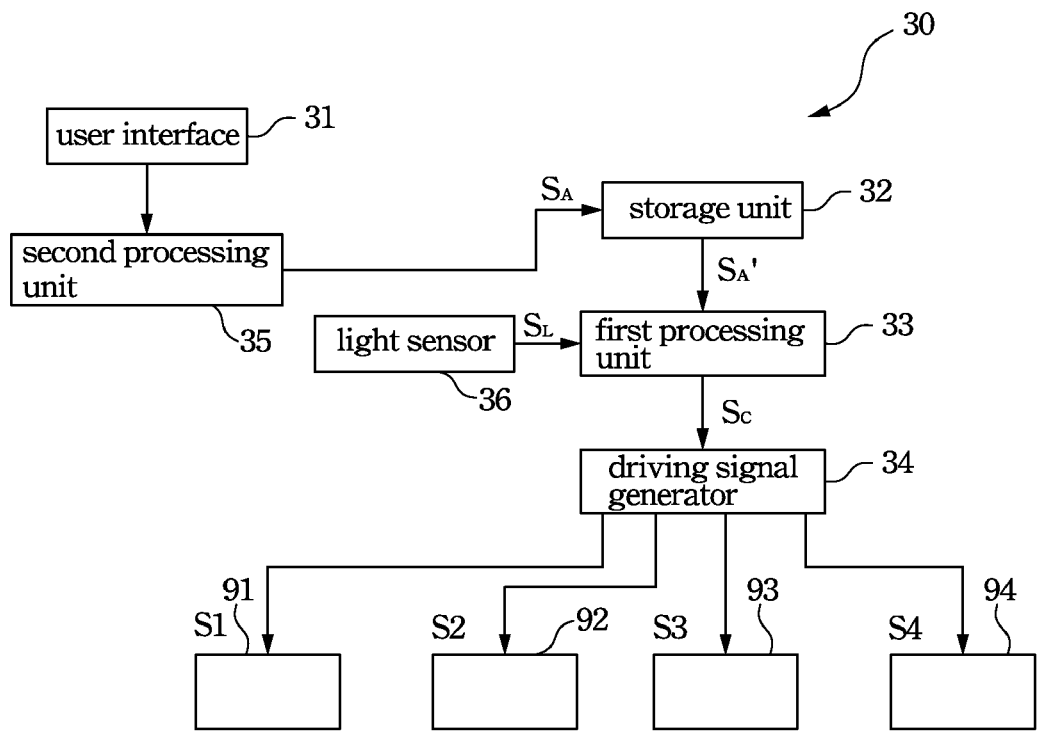
FIG. 3 is a functional block diagram of a portable electronic device according to a second embodiment of the invention.

On the other hand, FIG. 3 is a functional block diagram of a portable electronic device according to a second embodiment of the invention. With reference to FIG. 3, the mobile phone 30 may include a light sensor 36, which detects ambient light outside the electronic device and outputs a light sensing signal $S_L$, and then the first processing unit 33 will adjust the control signal $S_c$ in accordance with the light sensing signal $S_L$ and the driving signal generator 34 generates the driving signals S1~S4 to control the brightness of the light emitting diodes 91~94.

Figure 4:
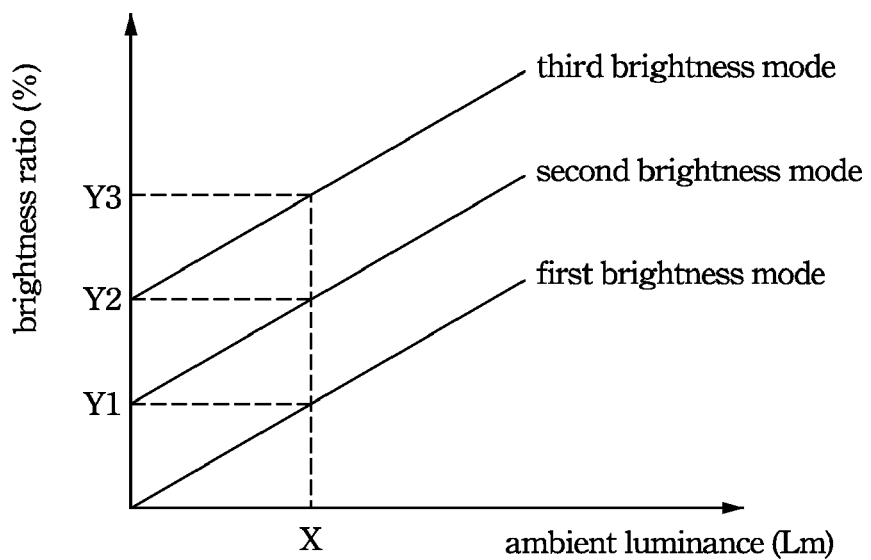
FIG. 4 is a schematic graph illustrating the relation between the ambient light luminance and the brightness ratios of light emitting diodes according to the second embodiment of the invention.

The aforesaid condition is illustrated in the FIG. 4, which is a schematic graph illustrating the relation between the ambient light luminance and the brightness ratio of light emitting diodes according to the second embodiment of the invention. For example, the mobile phone is operated in a first brightness mode, a second brightness mode, and a third brightness mode, respectively corresponding to brightness ratios Y1%, Y2% and Y3% (from low to high). With consideration of the embodiment, the brightness of the light emitting diodes 91~94 are automatically adjusted in accordance with ambient light luminance detected, and users can set the brightness level meeting their requirements. In addition, when the luminance of the ambient light changes, the brightness of the light emitting diodes 91~94 varies accordingly.

For example, if the mobile phone is operated in the third brightness mode with Y3% equal to 80%, the highest luminance of the light emitting diodes 91~94 operated in third brightness mode is 80% of the greatest luminance that the light emitting diodes 91~94 can emit.

Therefore, the luminance of the light emitting diodes 91~94 can be adjusted with ambient light, such that users can be aware of the flickering light emitting diodes when ambient light is strong.

Figure 5:
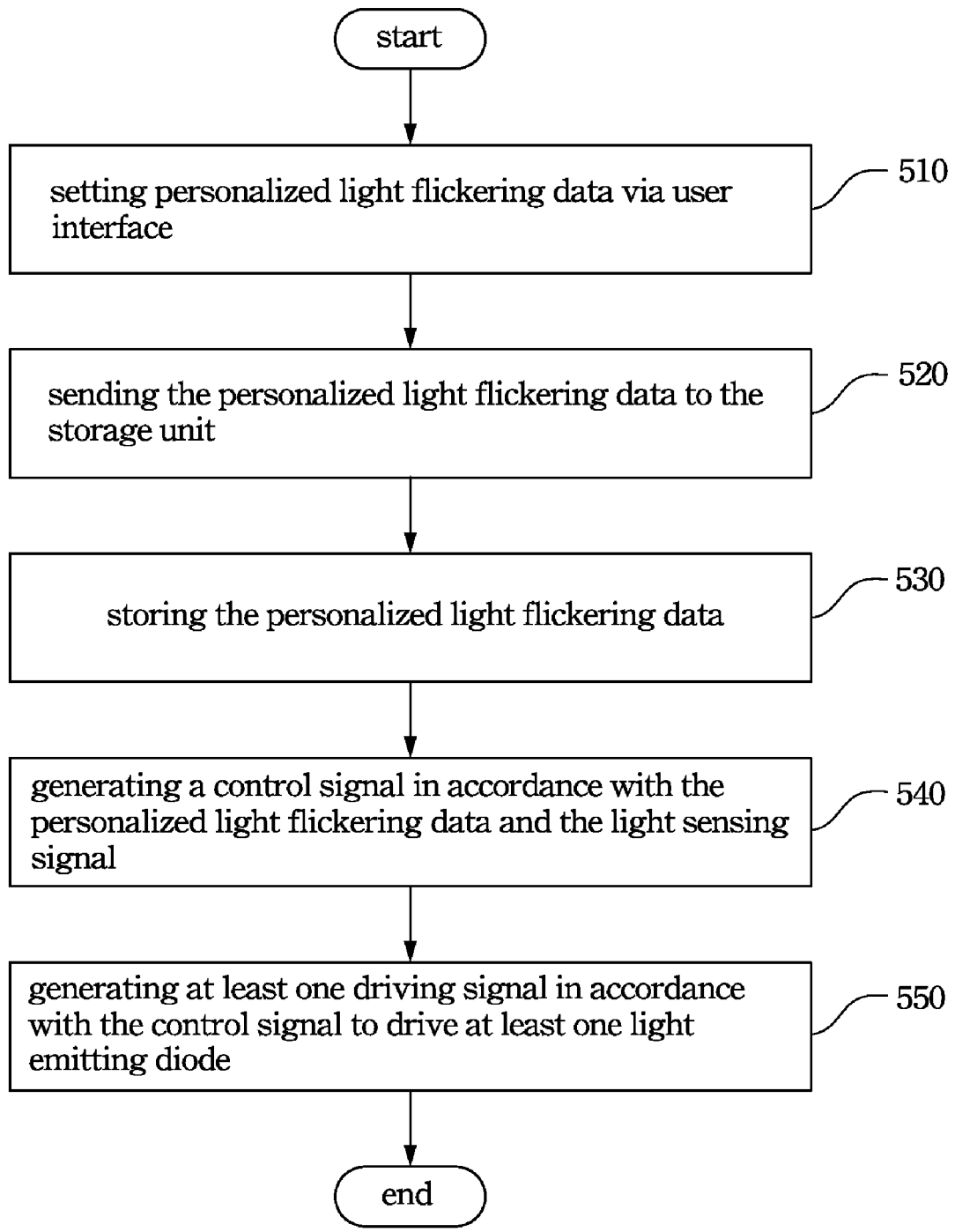
FIG. 5 is a flow chart of a flickering modulating method according to a third embodiment of the invention.

FIG. 5 is a flow chart of a light flickering method according to a third embodiment of the invention. Referring to FIG. 3 and FIG. 5, the light flickering method provided in the third embodiment includes the following steps. In step 510, the user of the mobile phone sets personalized light flickering data $S_A$ with a user interface, and then, in step 520, the second processing unit 35 sends the personalized light flickering data $S_A$ to the storage unit 32. In step 530, the storage unit 32 stores the personalized light flickering data $S_A$. In step 540, the first processing unit 33 receives the personalized light flickering data $S_A$ from the storage unit 32 and the light sensing signal $S_L$ from the light sensor 36, and then generates a control signal $S_C$ in accordance with the personalized light flickering data and the light sensing signal $S_L$. In step 550, the driving signal generator 34 receives the control signal $S_C$ from the first processing unit 33, and then generates driving signals S1~S4 to drive the light emitting diodes 91~94. The personalized light flickering data includes luminance values respectively corresponding with different setting points set by the users of the mobile phone, or other luminance values calculated according to adjacent setting points.

Figure 6:
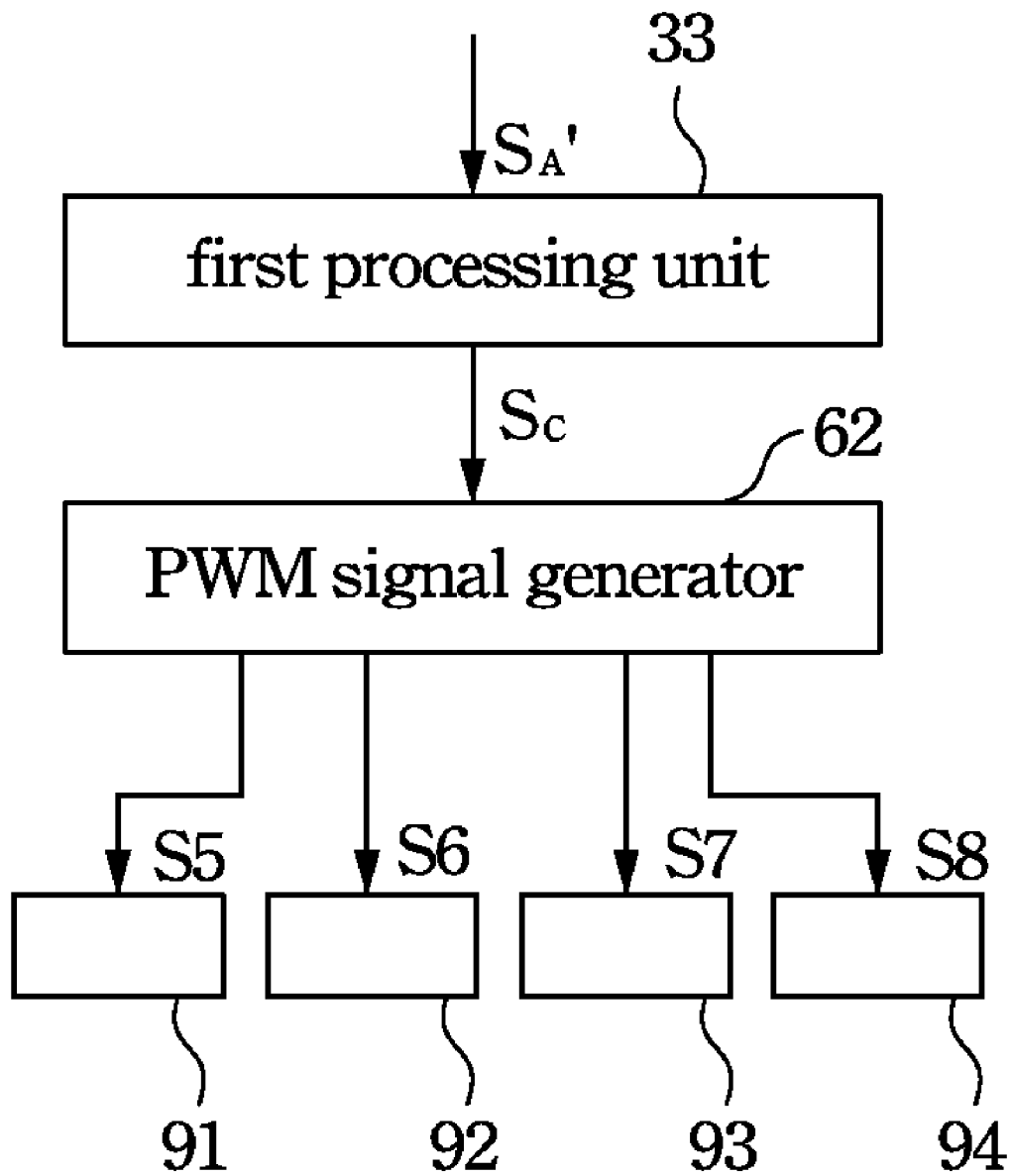
FIG. 6 is a circuit block diagram illustrating a part of portable electronic device with which PWM signals are generated according to one embodiment of the invention.

FIG. 6 is a circuit block diagram illustrating a part of portable electronic device with which PWM signals are generated according to one embodiment of the invention. In the embodiment, if the duty ratios of the pulse width modulating signals S5~S8 are higher, the brightness of the light emitting diodes being driven are higher. The first processing unit 33 receives the personalized light flickering data $S_A'$, which includes luminance values respectively corresponding with different setting points set by the users of the mobile phone, and can calculate other luminance values in different time according to adjacent setting points so as to generate the control signal $S_C$ in accordance with the luminance values. The PWM signal generator 62 receives the control signal $S_C$ from the first processing unit 33 and adjusts the duty ratios of the pulse width modulation signals, such that the duty ratios can be adjusted in accordance with the luminance values set by user and other luminance values calculated by the first processing unit 33.

Figure 7A:
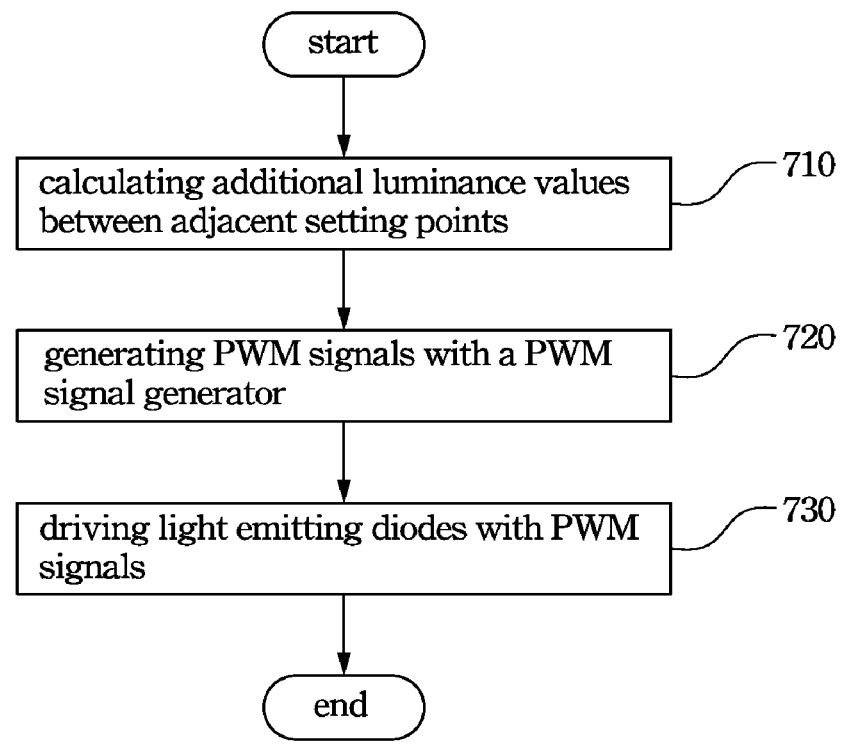
FIG. 7A is a flow chart showing the generation process of the PWM signals according to one embodiment of the invention.

FIG. 7A is a flow chart showing the generation process of the PWM signals according to one embodiment of the invention. With reference to FIG. 6 and FIG. 7A, in step 710, the first processing unit 33 calculates additional luminance values between adjacent setting points of the personalized light flickering data $S_A'$, wherein the additional luminance values calculated may satisfy a linear, quadratic, cubic or exponential function, and then the first processing unit 33 generates a control signal $S_C$ in accordance with the setting points and the luminance values calculated. Later, in step 720, the PWM signal generator 62 generates PWM signals S5~S8 in accordance with the control signal $S_C$ from the first processing unit 33. Then, in step 730, the PWM signals S5~S8 are outputted to drive the corresponding light emitting diodes 91~94, such that the light emitting diodes 91~94 may flicker in a specific way set by the users.

Figure 7B:
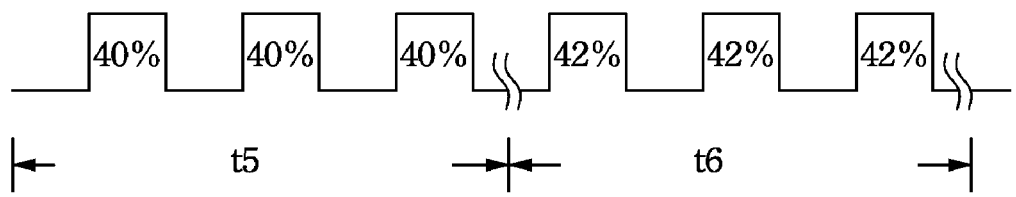
FIG. 7B shows an exemplary waveform of the PWM signals according to the embodiment of the invention.

FIG. 7B shows an exemplary waveform of the PWM signals according to one embodiment of the invention. Reference is now made to FIG. 6 and FIG. 7B. During a predetermined period t5 (such as 10 ms), the first processing unit 33 outputs a control signal $S_C$ to the PWM signal generator 62 such that the PWM signal generator 62 generates a PWM signal with a duty ratio of 40%. Then, the first processing unit 33 continues to output the next control signal $S_C$ in accordance with the luminance value corresponding to the next predetermined period t6, such that the PWM signal generator 62 may produce another PWM signal with a duty ratio of 42% to gradually adjust the brightness of the light emitting diodes.

In such a manner, that the PWM signal generator 62 generates the PWM signals S5~S8 to drive the light emitting diodes in accordance with the flickering mode set by the users, and the light emitting diodes can flicker according to the users' demand.

Figure 8:
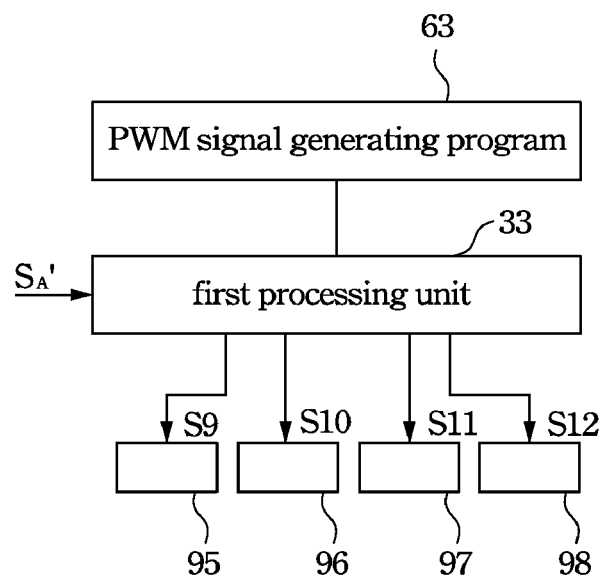
FIG. 8 is a functional block diagram illustrating another part of portable electronic device with which PWM signals are generated according to one embodiment of the invention.

FIG. 8 is a functional block diagram illustrating another part of portable electronic device with which PWM signals are generated according to one embodiment of the invention. With reference to FIG. 8, despite implementing the aforesaid PWM signal generator, a PWM signal generating program 63 can be executed by the first processing unit 33 to generates PWM signals S9~S12 for driving light emitting diodes 95~98. In the embodiment of the invention, the PWM signal generator 62 and the PWM signal generating program 63 shown in FIG. 6 and FIG. 8 can be both taken to generate PWM signals S5~S12 so as to drive more light emitting diodes 91~98 within one mobile phone. Additionally, the first processing unit 33 may generate PWM signals according to two timers, and one timer is configured to be used by the PWM signal generator 62 and the other timer is configured to be used by the PWM signal generating program 63.

Figure 9:
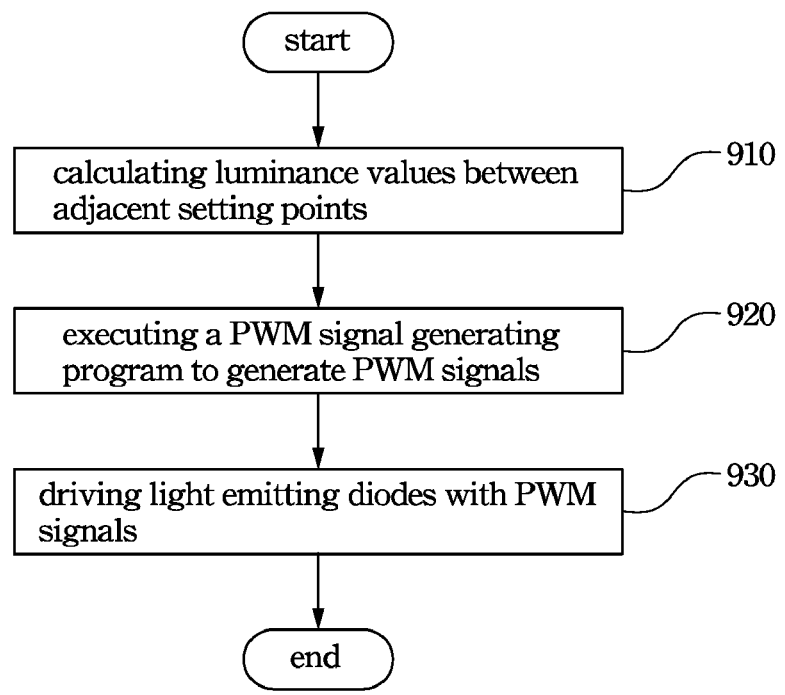
FIG. 9 is a flow chart showing the generation process of the PWM signals with the device of FIG. 8.

FIG. 9 is a flow chart showing the generation process of the PWM signals with the device of FIG. 8. Referring to FIG. 8 and FIG. 9, in step 910, after the user sets certain setting points with the user interface, the luminance values between adjacent setting points are calculated. Then, in step 920, PWM signals are generated with the PWM signal generating program 63 executed by the first processing unit 33. In step 930, PWM signals are later transmitted to the light emitting diodes 95~98 via a GPIO interface for driving the light emitting diodes.

Figure 10:
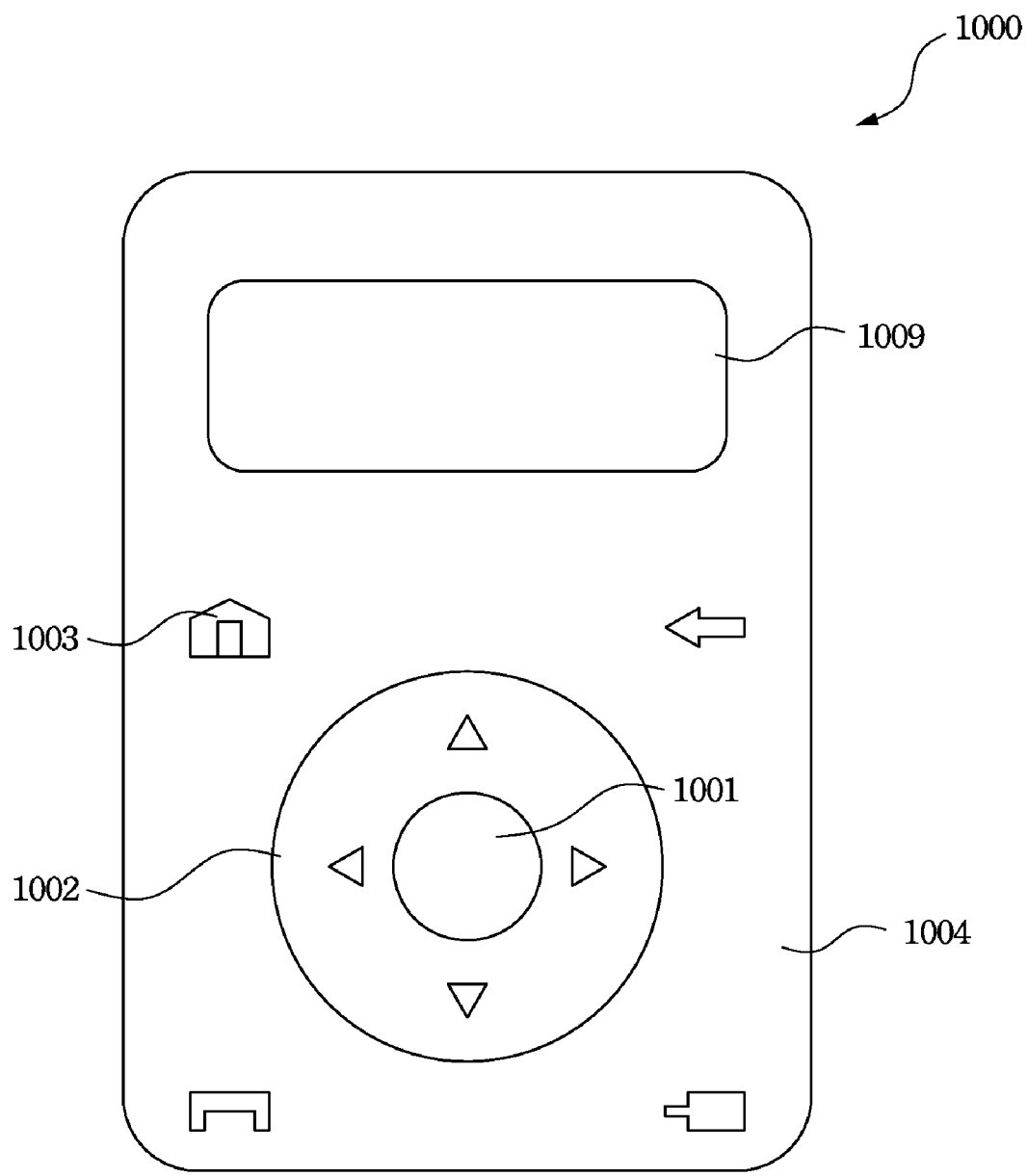
FIG. 10 is a top view of a portable electronic device according to embodiments of the invention.

FIG. 10 is a top view of a portable electronic device according to one embodiment of the invention. As shown in FIG. 10, the mobile phone 1000 has a case surface 1004, on which a key 1001, a ring key 1002, hinting patterns 1003 and a display 1009 are disposed. Hinting patterns 1003 may include a calling accepting pattern and a battery pattern. When a phone call is received, the calling accepting pattern is lit up and flickers to inform the users. In addition, when the battery of the mobile phone 1000 has completely been charged, the battery pattern is lit up and flickers to inform the users. If the mobile phone 1000 has network function, the hinting patterns 1003 may also include a home pattern and a previous page pattern. When the user surfs the Internet through a browser, the home pattern and the previous page pattern, with which the user can rapidly return to a homepage or the previous page, can be lit up and flicker.

Figure 11:
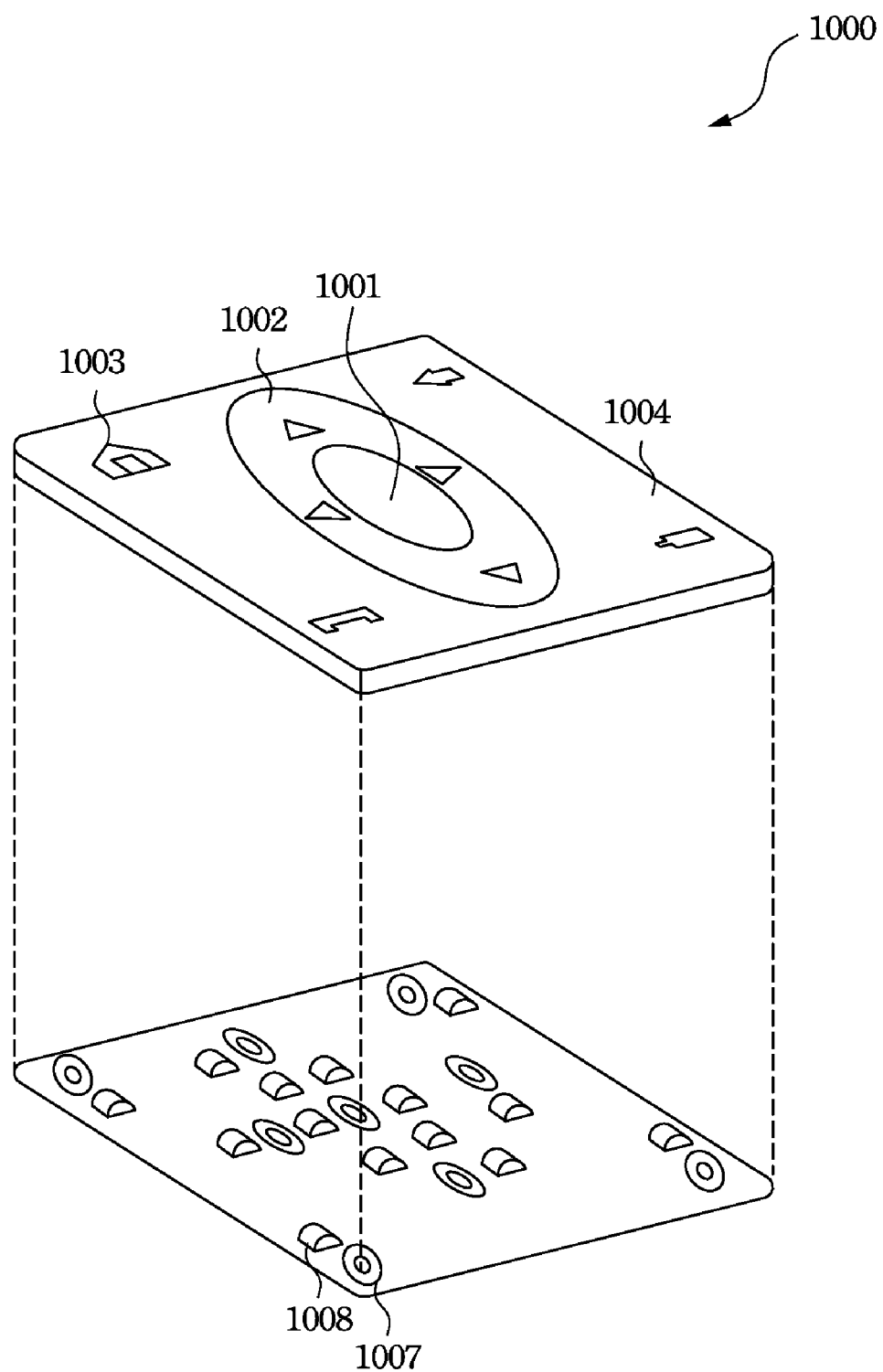
FIG. 11 is an explosive view showing a part of the portable electronic device shown in FIG. 10 according to embodiments of the invention.

FIG. 11 is an explosive view showing a part of a portable electronic device according to one embodiment of the invention. With reference to FIG. 11, each of the key 1004, the ring key 1002 and the hinting patterns 1003 has at least one switching element 1007 and one light emitting diode 1008 disposed therebelow. Once the user pushes the key 1001, the ring key 1002, or one of the hinting patterns 1003, the corresponding switching element 1007 can be pushed down and turn on to generate a signal to the processing unit.

On the other hand, the key 1001 and the ring key 1002 may alternatively flicker to notify the users of any different operating mode. For example, when the battery of the mobile phone is being charged, the six light emitting diodes disposed below the key 1001 may flicker sequentially to present a smooth visual effect.

However, the aforesaid hinting patterns are exemplary only, and the hinting patterns may include other patterns, such as low battery, information notification, data transmission, high temperature and warning etc.

From the above description, with the portable electronic device provided in the embodiments of the invention, the user can set up a specific flickering mode via a user interface to make the light emitting diodes flicker according to their own demands. Also, the brightness of the light emitting diodes can be automatically adjusted according to the ambient light such that the user can be notified by a strong adjusted flickering light when the ambient light is strong.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A portable electronic device, comprising:
    a display;
    at least one light emitting element;
    a user interface for setting a personalized light flickering data, which includes a plurality of predetermined luminance values and a plurality of timing values, which correspond to the predetermined luminance values respectively, wherein the user interface includes a user operation interface displayed on the display and a touch panel adapted to input personalized light flickering data into the user operation interface;
    a storage unit for storing the personalized light flickering data set with the user interface;
    a first processing unit for generating a control signal in accordance with the personalized light flickering data stored in the storage unit; and
    a driving signal generator for generating at least one driving signal in accordance with the control signal to drive the at least one light emitting element.

2. The portable electronic device of claim 1, further comprising a second processing unit for transmitting the personalized light flickering data to the storage unit.

3. The portable electronic device of claim 1, further comprising a light sensor for detecting ambient light outside the electronic device and outputting a light sensing signal in accordance with an intensity of the detected ambient light, wherein the first processing unit adjusts the control signal in accordance with the light sensing signal.

4. The portable electronic device of claim 1, wherein the first processing unit is further configured for calculating an average luminance value in accordance with two of the predetermined luminance values.

5. The portable electronic device of claim 1, wherein the at least one driving signal is a pulse width modulation (PWM) signal.

6. The portable electronic device of claim 5, wherein the duty ratio of the pulse width modulation signal is adjusted in accordance with the control signal.

7. The portable electronic device of claim 6, wherein the driving signal generator comprises at least one pulse width modulation signal generator for generating the pulse width modulation signal.

8. The portable electronic device of claim 1, further comprising another light emitting element, wherein the first processing unit is further configured for executing a signal generating program to generate another driving signal for driving the another light emitting element.

9. The portable electronic device of claim 1, further comprising a case surface, which has at least one pattern, wherein the pattern is lit up and flickers by the light emitting element.

10. The portable electronic device of claim 9, further comprising a switching element disposed below the pattern.

11. The portable electronic device of claim 1, wherein the light emitting element is a light emitting diode.

12. A light flickering method for a light emitting element disposed on a portable electronic device having a display and a user interface, the method comprising:
   setting a personalized light flickering data with the user interface, wherein the personalized light flickering data includes a plurality of predetermined luminance values and a plurality of timing values, which correspond to the predetermined luminance values respectively, and wherein the user interface includes a user operation interface displayed on the display and a touch panel adapted to input personalized light flickering data into the user operation interface;
   storing the personalized light flickering data set with the user interface;
   generating at least one control signal in accordance with the stored personalized light flickering data; and
   generating a driving signal by a driving signal generator in accordance with a control signal and driving the light emitting element with the driving signal.

13. The method of claim 12, further comprising:
   transmitting the personalized light flickering data to a storage unit with a processing unit.

14. The method of claim 12, further comprising:
   detecting ambient light outside the electronic device and outputting a light sensing signal in accordance with an intensity of the detected ambient light; and
   adjusting the control signal in accordance with the light sensing signal.

15. The method of claim 12, further comprising:
   calculating an average luminance value in accordance with two of the predetermined luminance values.

16. The method of claim 12, wherein the driving signal is a pulse width modulation signal and the method further comprises:
   adjusting the duty ratio of the pulse width modulation signal by the control signal.

* * * * *